May 6, 1930. J. M. JOHNSON 1,757,252
REPAIR LINK FOR NONSKID TIRE CHAINS
Filed Sept. 17, 1926

Inventor:
Jay M. Johnson
By Munday, Clarke & Carpenter
Attys:-

Patented May 6, 1930

1,757,252

UNITED STATES PATENT OFFICE

JAY M. JOHNSON, OF CHICAGO, ILLINOIS, ASSIGNOR, BY MESNE ASSIGNMENTS, TO PETER J. NAGLE, OF ROCHESTER, NEW YORK

REPAIR LINK FOR NONSKID TIRE CHAINS

Application filed September 17, 1926. Serial No. 136,091.

This invention relates to repair links for automobile non-skid tire chains and the like and has for its object broadly the provision of an improved repair link which will not require the employment of tools or other equipment to instal and permanently secure it in operative position to replace a worn or broken link of a non-skid tire chain.

It has for a more specific and important object the provision of a repair link of the character above set forth, which inherently, because of its construction, cannot be improperly installed in place.

Another important object of the invention is the provision of a link of this character which, when incorporated in a non-skid chain in place of a removed or broken link, will possess no tendency to kink the chain.

A still further important object of the invention is the provision of a link of this character which will be cheaply manufactured and which may be supplied to the usual automobile owner or driver without the need for special instructions as to its installation and action.

Other objects and advantages of the invention will be apparent as it is better understood from the following description, which, when taken in connection with the accompanying drawings, discloses a preferred embodiment thereof.

Figure 1:
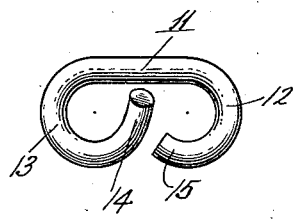
Figure 1 is a top plan view of a repair link embodying my present invention.
Figure 2:
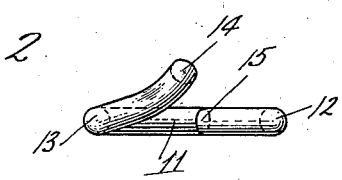
Fig. 2 is a side elevation thereof.
Figure 3:
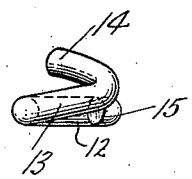
Fig. 3 is an end elevation.
Figure 4:
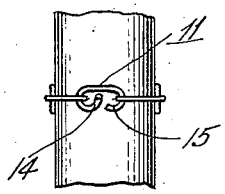
Fig. 4 is a partial detail on a smaller scale showing the link in operative relation in a non-skid chain about a tire.

The link selected as the preferred form of my present invention is constructed of a piece of ductile rod stock of sufficient stiffness to secure the attached links in service. The rod is bent to provide a relatively straight central portion 11 and to provide loops 12 and 13 at the ends. When the link is first constructed one end 14 of it is bent up above the general plane of the link and over to above the inner edge or side of the straight central portion 11. The end 15 is bent until it is arranged substantially vertically under the adjacent side of the end 14. This construction arranges the loop 12 substantially in the plane of the central body portion 11 and the loop 13 in a plane at a slight angle thereto. Thus constructed no difficulty is presented in hooking the loops into the links connected in the replacement, it only being necessary to thread a link into each loop. As the wheel revolves after the link is in place the end 14 is mashed down under the weight of the vehicle into the plane of the loop 12 and body 11. This movement of the end 14 closes both loops and so separates the eyes that they provide closed loops, the end 14 coming into contact or substantially into contact with the end 15 and with the body portion also.

It will be manifest that it is impossible to incorrectly instal the link in the chain, there being no important difference whether the end 14 extends up or down from the tire or extends to the left or right, the pressure between the tire and the road bringing the link to the desired form in any event.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A repair link for an automobile non-skid chain, comprising, a piece of rod stock bent to provide a straight central portion and the ends thereof extending into loops in the same direction from said central portion, one of said ends extending toward the central portion and being longer than the other and spaced therefrom to permit insertion in the chain to be repaired and adapted under the weight of the automobile to be bent to the plane of the other end and in close proximity to the central portion to close both of the loops of said link.

2. A repair link for an automobile nonskid chain, comprising, a piece of rod stock having a straight central portion to provide a side of the link and bent at its ends to form loops at the ends of said central portion, one loop being disposed wholly within substantially the same plane as said central portion and having its end bent toward said central portion, and the other loop being disposed partially in said plane and having its end also extending toward said central portion, but projecting from said plane to permit connection of the link of the chain to be repaired, said projecting end being adapted to be mashed down under the weight of the automobile to position said loops in mutual locking relationship.

3. A repair link for an automobile tire chain, comprising a length of wire having a substantially straight central portion, one end of said wire being bent to form an open loop lying in the plane of the central portion for engagement with a link of a broken tire chain, the terminal part of said loop curving inwardly toward said central portion to reduce liability of premature disengagement of said link, the opposite end of said wire being bent to form a second loop substantially on the same side of said central portion as said first loop but displaced vertically from the plane of the first loop when such plane is arranged horizontally, said second loop being open for engagement with another link of a broken tire chain, the terminal part of said second loop extending in a general direction toward said central portion and terminating at a point above and slightly on one side of said central portion, so that when said second loop is flattened down by the weight of a vehicle it will be brought substantially into the plane of the first loop and central portion, the end of said second loop then lying closely adjacent said central portion so that said loop is closed, the terminal portion of said second loop substantially closing the opening in said first loop.

4. A repair link for automobile tire chains, comprising a length of wire having a substantially straight central portion, the ends of the wire being bent to form two open loops each of which may be engaged with a link of a broken tire chain, the first of said loops lying substantially in the plane of the central portion and having a gap between the end of said loop and said central portion, the second loop extending substantially spirally out of the plane of said first loop substantially on the same side of said central portion as said first loop and having a terminal portion extending in a transverse direction relative to said central portion of the link and adjacent the end of the first loop, so that when said link is flattened by the weight of a vehicle, the terminal portion of said second loop will come substantially into contact with said central portion and with the end of said first loop to form two substantially closed loops out of communication with each other.

5. A repair link for an automobile tire chain, comprising a length of wire having a substantially straight central portion, the ends of said wire being bent to form two open loops substantially on the same side of said central portion and each engageable with a link of a broken tire chain, the ends of both of said loops curving inwardly toward said central portion to lessen liability of premature disengagement of said tire chain links from said loops, the terminal portion of one of said loops being arranged to be deformed by the weight of a vehicle substantially to close said loops.

JAY M. JOHNSON.